(12) United States Patent
Li

(10) Patent No.: US 12,283,948 B2
(45) Date of Patent: Apr. 22, 2025

(54) TOUCH BUTTON, CONTROL METHOD, AND ELECTRONIC DEVICE

(71) Applicant: VIVO MOBILE COMMUNICATION CO., LTD., Dongguan (CN)

(72) Inventor: Honggen Li, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 289 days.

(21) Appl. No.: 17/845,983

(22) Filed: Jun. 21, 2022

(65) Prior Publication Data

US 2022/0321120 A1 Oct. 6, 2022

Related U.S. Application Data

(63) Continuation of application No. PCT/CN2020/139047, filed on Dec. 24, 2020.

(30) Foreign Application Priority Data

Dec. 25, 2019 (CN) .......................... 201911355234.7

(51) Int. Cl.
*H03K 17/96* (2006.01)
*G06F 21/32* (2013.01)
(Continued)

(52) U.S. Cl.
CPC .......... *H03K 17/962* (2013.01); *G06F 21/32* (2013.01); *H03K 17/975* (2013.01); *H03K 17/98* (2013.01); *H03K 2217/9651* (2013.01)

(58) Field of Classification Search
CPC ...... G06F 3/033; G06F 3/0338; G06F 3/0354; G06F 3/03547–0362; G06F 3/038;
(Continued)

(56) References Cited

U.S. PATENT DOCUMENTS

| 2013/0126325 | A1 | 5/2013 | Curtis et al. |
| 2014/0267134 | A1 | 9/2014 | Bulea et al. |

(Continued)

FOREIGN PATENT DOCUMENTS

| CN | 104808874 A | 7/2015 |
| CN | 105824479 A | 8/2016 |

(Continued)

OTHER PUBLICATIONS

International Search Report issued in corresponding International Application No. PCT/CN2020/139047, mailed Mar. 22, 2021, 4 pages.

(Continued)

*Primary Examiner* — Nathan Danielsen
(74) *Attorney, Agent, or Firm* — IPX PLLC

(57) ABSTRACT

A touch button, a control method, and an electronic device are provided. The touch button includes a first conductive part, a second conductive part, and a touch part, where the second conductive part surrounds the first conductive part to form a capacitance structure. The method includes receiving a touch input acting on the touch part; detecting whether the second conductive part has any capacitance change in a plurality of preset directions; and determining, in a case a capacitance change exists in a target direction among the plurality of preset directions, a control instruction corresponding to the target direction. According to the method, when the touch button receives the touch input, the touch part transfers pressure to the first conductive part, so that the first conductive part moves relative to the second conductive part resulting in a change of capacitance.

17 Claims, 5 Drawing Sheets

(51) Int. Cl.
*H03K 17/975* (2006.01)
*H03K 17/98* (2006.01)

(58) Field of Classification Search
CPC .............. G06F 3/039; G06F 2203/0336; G06F 2203/0338; G06F 21/32; H03K 17/962; H03K 17/9622; H03K 17/975; H03K 17/98; H03K 2217/9651
See application file for complete search history.

(56) References Cited

U.S. PATENT DOCUMENTS

| | | | |
|---|---|---|---|
| 2015/0074615 A1* | 3/2015 | Han | H04L 63/0861 715/863 |
| 2016/0033342 A1 | 2/2016 | Lyon et al. | |
| 2017/0116929 A1 | 4/2017 | Hirakata | |
| 2019/0131969 A1* | 5/2019 | Boese | H03K 17/962 |

FOREIGN PATENT DOCUMENTS

| | | |
|---|---|---|
| CN | 106160719 A | 11/2016 |
| CN | 109141692 A | 1/2019 |
| CN | 111049510 A | 4/2020 |
| EP | 3046042 A1 | 7/2016 |
| JP | 2005038812 A | 2/2005 |
| KR | 20160095608 A | 8/2016 |
| KR | 20170043775 A | 4/2017 |
| KR | 20180131832 A | 12/2018 |

OTHER PUBLICATIONS

Office Action issued in related Korean Application No. 10-2022-7025853, mailed Nov. 6, 2023, 6 pages.
First Office Action issued in related Chinese Application No. 201911355234.7, mailed Feb. 20, 2023, 6 pages.
Extended European Search Report issued in related European Application No. 20906941.8, mailed Dec. 21, 2022, 7 pages.
Examination Report issued in related Indian Application No. 202217041336, mailed Feb. 1, 2023, 6 pages.
Office Action issued in related Korean Application No. 10-2022-7025853, mailed May 3, 2024, 4 pages.

* cited by examiner

TOUCH BUTTON, CONTROL METHOD, AND ELECTRONIC DEVICE

CROSS-REFERENCE TO RELATED APPLICATIONS

This application is a continuation of International Application No. PCT/CN2020/139047, filed Dec. 24, 2020, which claims priority to Chinese Patent Application No. 201911355234.7, filed Dec. 25, 2019. The entire contents of each of the above-referenced applications are expressly incorporated herein by reference.

TECHNICAL FIELD

Embodiments of the present disclosure relate to the field of electronic device technologies, and in particular, to a touch button, a control method, and an electronic device.

BACKGROUND

Currently, a plurality of physical buttons with different functions are usually disposed on electronic devices such as mobile phones and wireless earphones. These buttons correspond to different operating functions, for example: switching on/off the electronic device, volume control, Bluetooth pairing, and fingerprint unlocking.

Referring to FIG. 1a and FIG. 1b, FIG. 1a shows a scenario in which a plurality of buttons are disposed on a mobile phone, including: a "volume+" button 111, a "volume−" button 112, a lock screen button 113, and a back button 114, FIG. 1b shows a scenario in which a plurality of buttons are disposed on a wireless earphone, including: a "volume+/previous" button 121, a "volume−/next" button 122, and a "on-off/Bluetooth pairing" button 123.

An existing electronic device has a relatively large number of touch buttons, and operations are complex. Buttons, if disposed closely, are easily touched by mistake.

SUMMARY

Embodiments of the present disclosure provide a touch button, a control method, and an electronic device. According to a first aspect, an embodiment of the present disclosure provides a touch button, including: a first conductive part, a second conductive part, and a touch part; where the second conductive part surrounds the first conductive part, a portion of the first conductive part is exposed from the second conductive part, a gap exists between an unexposed portion of the first conductive part and the second conductive part, and the first conductive part is movable relative to the second conductive part; and the touch part is in contact with the exposed portion of the first conductive part.

According to a second aspect, an embodiment of the present disclosure provides a control method, applied to an electronic device, the electronic device including the touch button according to the first aspect, the method including:
  receiving a touch input acting on a touch part of the touch button, where the touch part transfers a pressure of the touch input to a first conductive part of the touch button, so that the first conductive part moves relative to a second conductive part of the touch button;
  detecting whether the second conductive part of the touch button has any capacitance change in a plurality of preset directions; and
  determining, in a case that a capacitance change exists in a target direction among the plurality of preset directions, a control instruction corresponding to the target direction.

According to a third aspect, an embodiment of the present disclosure provides an electronic device, including the touch button according to the first aspect, a processor, a memory, and a program that is stored in the memory and executable by the processor, the program, when executed by the processor, implementing the operations of the control method according to the second aspect.

According to a fourth aspect, an embodiment of the present disclosure provides a computer-readable storage medium, storing a computer program, the computer program, when executed by a processor, implementing the operations in the foregoing control method.

In an embodiment of the present disclosure, when a touch button receives a touch input, a touch part transfers a pressure to a first conductive part, so that the first conductive part moves relative to a second conductive part, thus changing the capacitance. A gesture of the touch input is determined based on a position of the capacitance change, and different control instructions are determined according to different gestures. In this way, various control operations can be realized by performing touch inputs with different gestures on one touch button, thereby reducing the quantity of touch buttons and preventing accidental touches.

BRIEF DESCRIPTION OF THE DRAWINGS

To describe the technical solutions in the embodiments of the present disclosure more clearly, the following briefly describes the accompanying drawings required for describing the embodiments of the present disclosure. Apparently, the accompanying drawings in the following description show merely some embodiments of the present disclosure. A person of ordinary skill in the art may still derive other drawings according to these accompanying drawings without creative efforts.

DETAILED DESCRIPTION

The following clearly describes the technical solutions in the embodiments of the present disclosure with reference to the accompanying drawings in the embodiments of the present disclosure. Apparently, the described embodiments are some embodiments of the present disclosure rather than all of the embodiments of the present disclosure. Based on the embodiments of the present disclosure, all other embodiments obtained by a person of ordinary skill in the art without creative efforts shall fail within the protection scope of the present disclosure.

In the embodiments of the present disclosure, the word "exemplary" or "for example" is used to represent giving an example, an illustration, or a description. Any embodiment or design scheme described as an "exemplary" or "for example" in the embodiments of the present disclosure should not be explained as being more preferred or having more advantages than another embodiment or design scheme. Exactly, the use of the word "exemplary" or "for example" or the like is intended to present a related concept in a specific manner.

In this specification, relational terms such as "first" and "second" are used only to differentiate same names, and do not imply a relationship or sequence between these names.

Figure 1A:
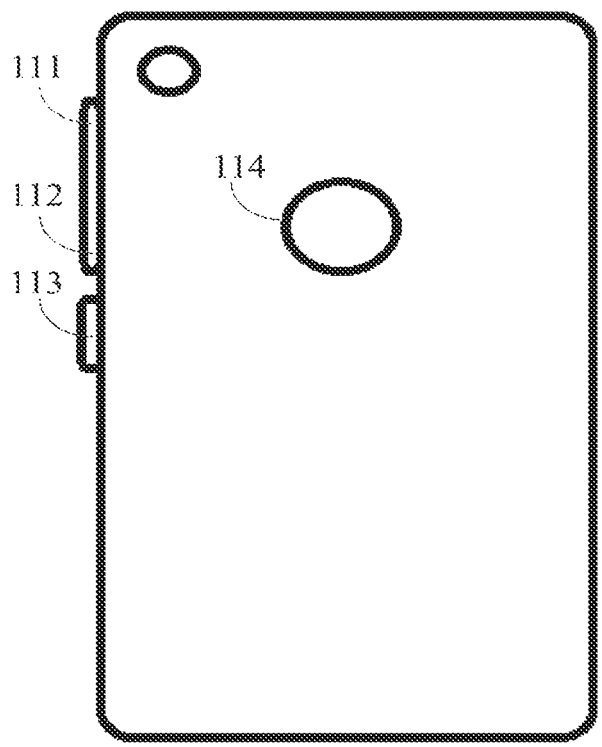
FIG. 1a is a first structural schematic diagram of touch buttons on an existing electronic device.
Figure 1B:
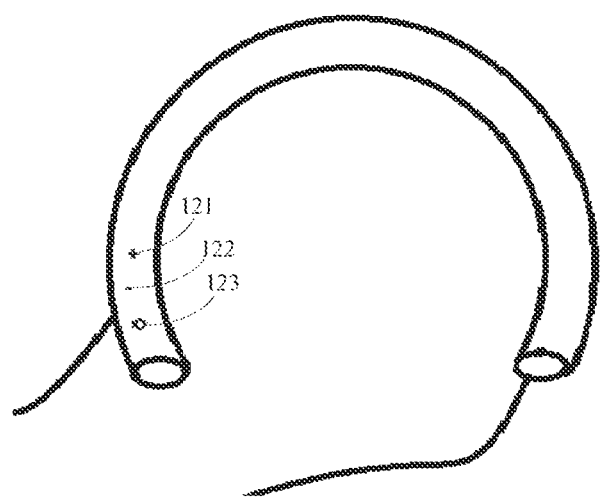
FIG. 1b is a second structural schematic diagram of touch buttons on an existing electronic device.
Figure 2:
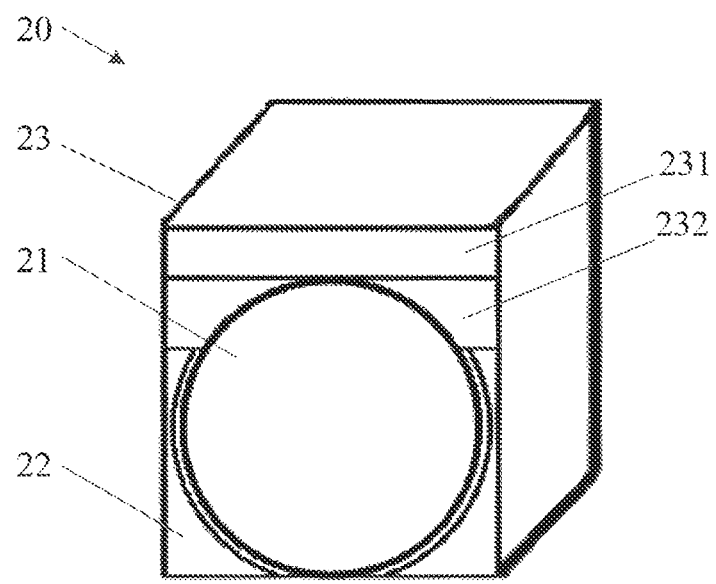
FIG. 2 is a schematic structural diagram of a touch button according to an embodiment of the present disclosure.

Referring to FIG. 2, an embodiment of the present disclosure provides a touch button 20, including: a first conductive part 21, a second conductive part 22, and a touch part 23.

The second conductive part 22 surrounds the first conductive part 21, and a portion of the first conductive part 21 is exposed from the second conductive part 22. A gap exists between an unexposed portion of the first conductive part 21 and the second conductive part 22. The first conductive part 21 is movable relative to the second conductive part 22. The touch part 23 is in contact with the exposed portion of the first conductive part 21.

In an embodiment of the present disclosure, the second conductive part 22 surrounds the first conductive part 21 with a gap therebetween, so that the first conductive part 21 and the second conductive part 22 form a capacitance structure. That is, a capacitive effect exists between the first conductive part 21 and the second conductive part 22. When the touch part 23 receives a touch input, the touch part 23 transfers a pressure of the touch input to the first conductive part 21, and the first conductive part 21 moves relative to the second conductive part 22, so that a distance between a local position of the first conductive part 21 and the second conductive part 22 is changed, thereby resulting in a capacitance change.

In this way, an electronic device using the touch button 20 can recognize a displacement direction of the first conductive part 21 relative to the second conductive part 22 by detecting a specific position of the capacitance change in the second conductive part 22, so that a gesture of the touch input acting on the touch part 23 is determined. Different control instructions may be determined based on different touch inputs, so as to realize one touch button with various control functions.

In an embodiment of the present disclosure, when the touch button receives the touch input, the touch part transfers a pressure to the first conductive part, so that the first conductive part moves relative to the second conductive part, thus changing the capacitance. A gesture of the touch input is determined based on a position of the capacitance change, and different control instructions are determined according to different gestures. In this way, various control operations can be realized by performing touch inputs with different gestures on one touch button, that is, reducing the quantity of touch buttons and preventing accidental touches.

In some embodiments, the first conductive part 21 is in a spherical shape, and the first conductive part 21 is capable of rolling relative to the second conductive part 22. For example, the first conductive part 21 is a sphere made of a metal material or another conductive material. The first conductive part 21 is in a spherical shape, so that a force effect of the first conductive part is kept consistent in any direction, which is convenient for a position of a capacitance change.

It may be understood that the first conductive part 21 may alternatively be in another shape, for example: a cube or a cylinder. Those skilled in the art may select the first conductive part 21 in a corresponding shape according to an actual product need.

In some embodiments, considering that a gap exists between the second conductive part 22 and the first conductive part 21, a non-conductive support member (not shown in FIG. 2) is disposed between the unexposed portion of the first conductive part 21 and the second conductive part 22.

It is to be noted that, a function of the support member is to support the first conductive part 21, so that a gap needs to be left between the second conductive part 22 and the first conductive part 21. Therefore, the support member needs to be made of a non-conductive material, to avoid affecting a capacitance between the second conductive part 22 and the first conductive part 21. For example, the support member includes a plurality of support pillars made of the non-conductive material and disposed between the second conductive part 22 and the first conductive part 21; alternatively, the support member is a filler made of the non-conductive material and disposed between the second conductive part 22 and the first conductive part 21.

Further, the support member may be elastic, so that after a user finishes the touch input, a position of the first conductive part 21 is restored to an initial position under the action of an elastic force of the support member, which facilitates capacitance detection next time a touch input is received.

In some embodiments, considering that the first conductive part 21 may be in various shapes, in order to improve a pressure transfer effect, referring to FIG. 2, the touch part 23 may include two parts, that is, a touch member 231 and an elastic member 232, where the touch member 231 is in contact with the exposed portion of the first conductive part 21 through the elastic member 232. It may be understood that, the elastic member 232 needs to be made of a non-conductive material to avoid affecting a capacitance effect between the first conductive part 21 and the second conductive part 22.

In an embodiment of the present disclosure, the touch member 231 is configured to receive the touch input of the user. FIG. 2 shows a scenario in which the touch member 231 is in a rectangular shape. It may be understood that, the touch member 231 may alternatively be in a circular shape, an oval shape, a cross shape, or the like. Those skilled in the art may select the touch member 231 in a corresponding shape according to an actual product need. The elastic member 232 is disposed between the touch member 231 and the exposed portion of the first conductive part 21 and configured to transfer a pressure. The elastic member 232 may be an elastic filling material filled between the touch member 231 and the first conductive part 21. In a practical application, the elastic member 232 should wrap the exposed portion of the first conductive part 21, so that when the touch member 231 receives the touch input, the pressure can be transferred to the first conductive part 21 through the elastic member 232.

In some embodiments, a fingerprint recognition module (not shown in FIG. 2) is disposed in the touch part 23, so that when the user performs the touch input on the touch part 23, fingerprint information of the user may be acquired through the fingerprint recognition module, and the touch button 20 has a fingerprint acquisition function.

An embodiment of the present disclosure provides a control method, executed by an electronic device. The electronic device may be a mobile phone, a tablet computer, a notebook computer, an ultra-mobile personal computer (UMPC), a netbook, a personal digital assistant (PDA), or the like. The electronic device includes the foregoing touch button.

Figure 3:
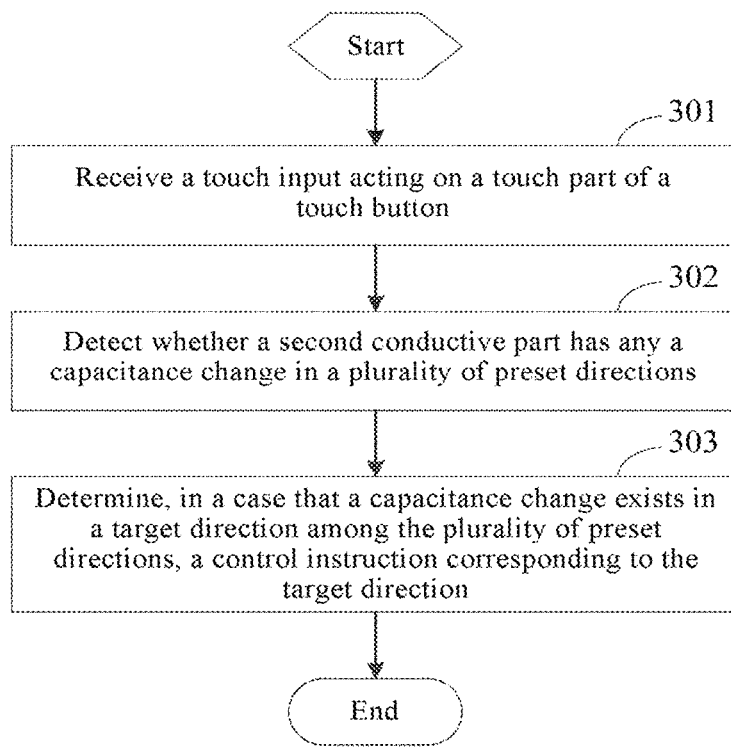
FIG. 3 is a schematic flowchart of a control method according to an embodiment of the present disclosure.

Referring to FIG. 3, specific steps of the method are as follows.

Step 301: Receive a touch input acting on a touch part of a touch button.

In an embodiment of the present disclosure, the touch input is received by using the touch part of the touch button, and the touch part transfers the pressure of the touch input to a first conductive part of the touch button, so that the first conductive part moves relative to a second conductive part, resulting in a capacitance change.

Step 302: Detect whether a second conductive part has any capacitance change in a plurality of preset directions.

In an embodiment of the present disclosure, an electronic device detects the capacitance change of the second conductive part in the plurality of preset directions, so as to determine, according to a specific position of the capacitance change, a direction in which the first conductive part moves relative to the second conductive part, thereby determining a gesture of the touch input of a user.

An independent detection module may be disposed in the electronic device, or a detection function may be integrated into a processor, and the capacitance change of the second. conductive part in the plurality of preset directions is detected by using an internal circuit of the electronic device.

The plurality of preset directions may include at least one of the following:

a first positive direction and a first negative direction along a first axis;

a second positive direction and a second negative direction along a second axis; and a third positive direction and a third negative direction along a third axis;

where the first axis, the second axis, and the third axis are perpendicular to each other.

Figure 4:
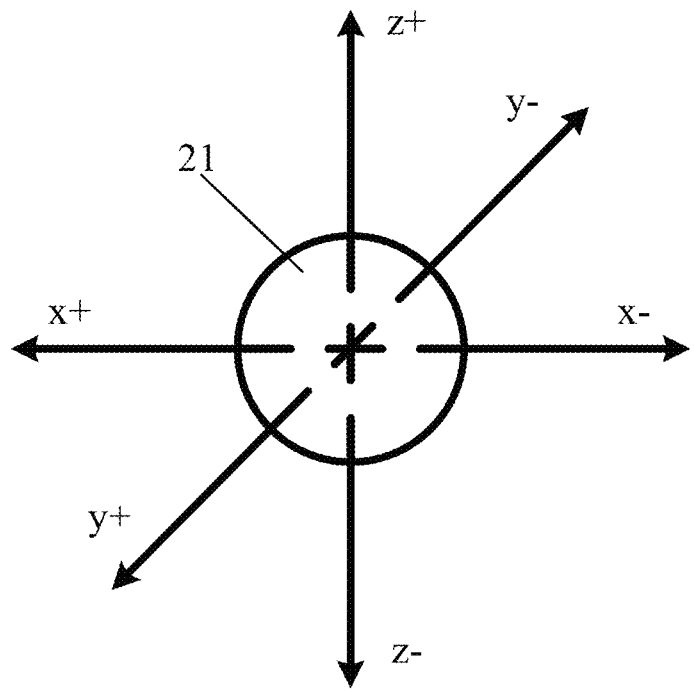
FIG. 4 is a first schematic diagram of an application scenario according to an embodiment of the present disclosure.

Specifically, referring to FIG. 4, a first conductive portion 21 includes a first axis and a second axis in a horizontal direction, and includes a third axis in a vertical direction. For convenience of description, axis x refers to the first axis, axis y refers to the second axis, and axis z refers to the third axis. Further, x+ refers to a first positive direction, x− refers to a first negative direction, y+ refers to a second positive direction, y− refers to a second negative direction, z+ refers to a third positive direction, and z− refers to a third negative direction.

In some embodiments, if a fingerprint recognition module is disposed in a touch part, fingerprint information may be acquired according to a touch input before step 302 is performed. In a case that the fingerprint information matches preset fingerprint information, step 302 is performed.

In an embodiment of the present disclosure, the fingerprint recognition module is disposed in the touch part, so that a touch button has a fingerprint acquisition function. In this way, when the touch input acting on the touch button is received, the fingerprint information of a user may be verified first, and after the verification succeeds, corresponding control is performed according to the touch input, thereby improving the use safety of an electronic device.

Step 303: Determine, in a case that a capacitance change exists in a target direction among the plurality of preset directions, a control instruction corresponding to the target direction.

In an embodiment of the present disclosure, the target direction refers to a direction in which the capacitance change is detected among the plurality of preset directions.

The description is made using the scenario shown in FIG. 4 as an example. If the electronic device detects a capacitance change in the x+ direction, a corresponding first control instruction is determined. Correspondingly, the x+ direction may correspond to a second control instruction, the y+ direction may correspond to a third control instruction, the y− direction may correspond to a fourth control instruction, the z+ direction may correspond to a fifth control instruction, and the z− direction may correspond to a sixth control instruction, so that six control functions may be integrated in one touch button.

On the basis of the scenario shown in FIG. 4, four preset directions may be added in a horizontal plane. For example, the preset directions are arranged at 45° between the x+ axis and the y− axis, and corresponding control instructions are matched with preset directions, so that ten control functions can be integrated in one touch button.

Further, in a case that a capacitance change exists in the target direction among the plurality of preset directions, the method further includes: acquiring a capacitance change parameter in the target direction; and determining a corresponding control instruction according to the target direction and the capacitance change parameter; where the capacitance change parameter includes at least one of the following: a capacitance change value, a quantity of capacitance changes, and a capacitance change duration.

In an embodiment of the present disclosure, the control instruction corresponding to the target direction may further be refined, and different touch input methods may be subdivided according to the capacitance change parameter in the target direction. For example, whether a user presses heavily or lightly can be determined according to the capacitance change value; whether the user performs a single-click press, a double-click press, a triple-click press, or the like can be determined according to the quantity of capacitance changes; and whether the user performs a common press or a long press according to the capacitance change duration.

In this way, the target direction and the capacitance change parameter in the target direction are comprehensively considered, so that inputs in different directions on the touch button correspond to different control instructions, and different input methods in a same direction also correspond to different control instructions, so that more control functions can be integrated in one touch button.

Figure 5A:
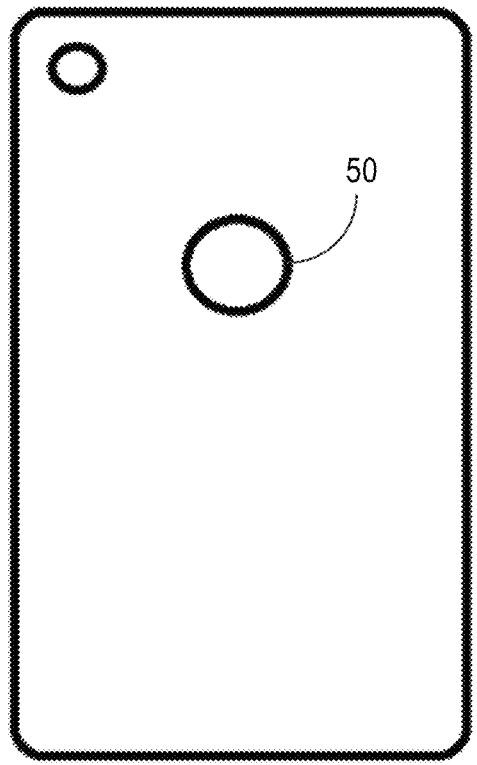
FIG. 5a is a second schematic diagram of an application scenario according to an embodiment of the present disclosure.
Figure 5B:
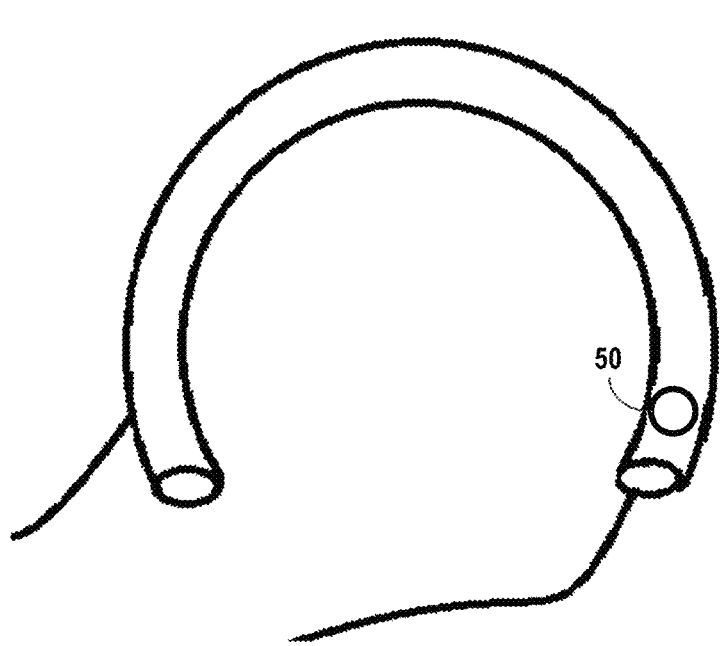
FIG. 5b is a third schematic diagram of an application scenario according to an embodiment of the present disclosure.

Referring to FIG. 5a and FIG. 5b, FIG. 5a shows a scenario in which a touch button and a control method according to the embodiments of the present disclosure are applied to a mobile phone. On the touch button 50, swiping up is to increase the volume, swiping down is to reduce the volume, swiping left is to turn on the camera, swiping right is to lock the screen, pressing once is to switch on/off, and pressing twice is to take a screenshot. FIG. 5b shows a scenario in which a touch button and a control method according to the embodiments of the present disclosure are applied to a wireless earphone. On the touch button 50, swiping up is to increase the volume, swiping down is to reduce the volume, swiping left is to fast forward, swiping right is to fast backward, pressing once is to switch on/off/ answer a call, pressing twice is to pause, and long pressing for 5 seconds is to perform Bluetooth pairing.

In an embodiment of the present disclosure, when the touch button receives a touch input, a touch part transfers pressure to a first conductive part, so that the first conductive part moves relative to a second conductive part, thus changing the capacitance. A gesture of the touch input is determined based on a position of the capacitance change, and different control instructions are determined according to different gestures. In this way, various control operations can be realized by performing touch inputs with different gestures on one touch button, thereby reducing the quantity of touch buttons and preventing accidental touches.

Figure 6:
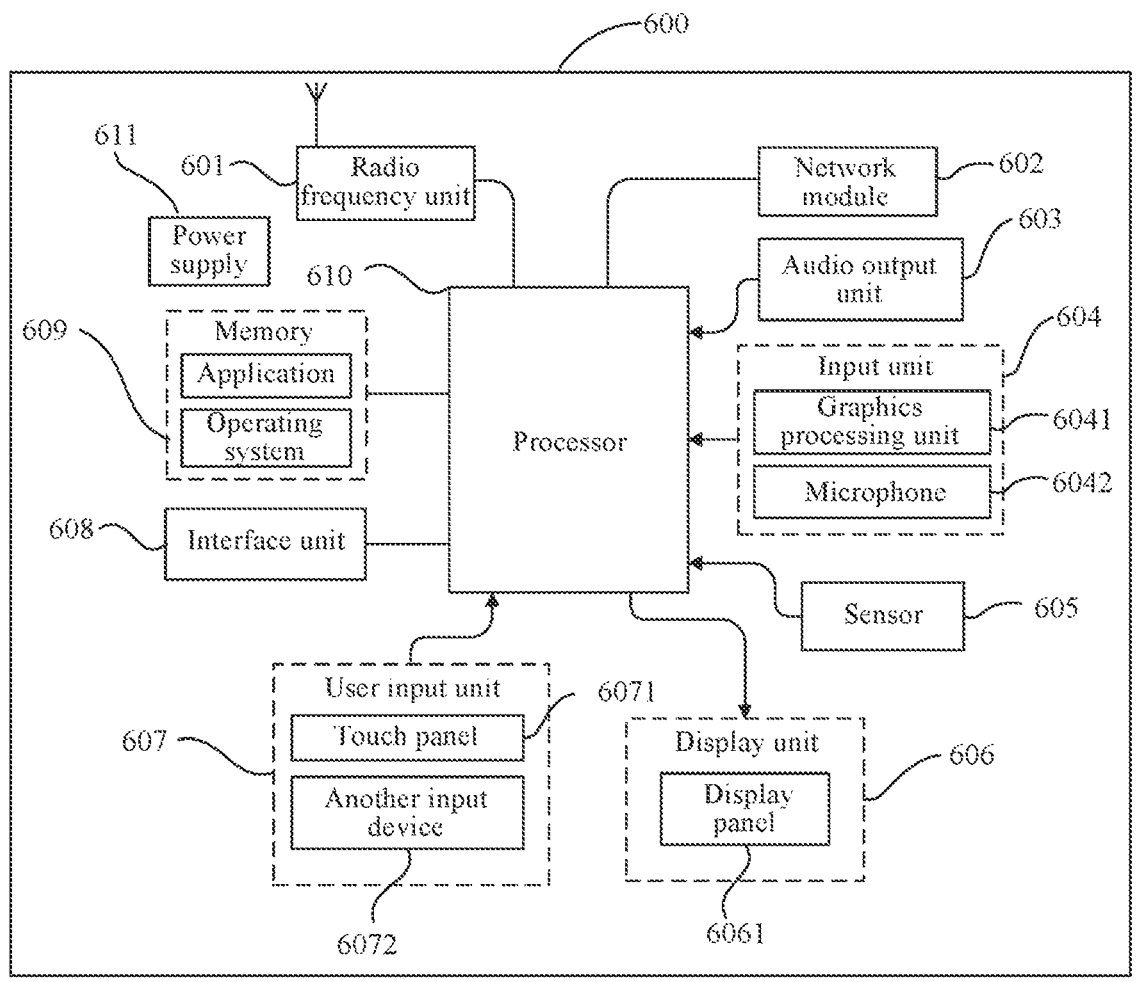
FIG. 6 is a schematic structural diagram of an electronic device according to an embodiment of the present disclosure.

FIG. 6 is a schematic diagram of a hardware structure for implementing an electronic device according to the embodiments of the present disclosure. The electronic device includes a touch button, and the touch button includes: a first conductive part, a second conductive part, and a touch part; the second conductive part surrounds the first conductive part, a portion of the first conductive part is exposed from the second conductive part, a gap exists between an unexposed portion of the first conductive part and the second conductive part, and the first conductive part is movable relative to the second conductive part; and the touch part is in contact with the exposed portion of the first conductive part.

As shown in the figure, the electronic device 600 includes, but is not limited to: components such as a radio frequency unit 601, a network module 602, an audio output unit 603, an input unit 604, a sensor 605, a display unit 606, a user input unit 607, an interface unit 608, a memory 609, a processor 610, and a power supply 611. A person skilled in the art may understand that the electronic device structure shown in FIG. 6 does not constitute a limitation to the electronic device. The electronic device may include more or fewer components than those shown in the figure, or some components may be combined, or a different component deployment may be used. In an embodiment of the present disclosure, the electronic device includes, but is not limited to, a mobile phone, a tablet computer, a notebook computer, a palmtop computer, an in-vehicle terminal, a wearable device, a pedometer, and the like.

In some embodiments, a computer program is stored on the memory 609, and is executable by the processor 610. The computer program, when executed by the processor 610, implements the following operations: receiving a touch input acting on a touch part of the touch button, where the touch part transfers pressure of the touch input to a first conductive part of the touch button, so that the first conductive part moves relative to a second conductive part of the touch button; detecting whether the second conductive part has any capacitance change in a plurality of preset directions; and determining, in a case that a capacitance change exists in a target direction among the plurality of preset directions, a control instruction corresponding to the target direction.

In this way, when the touch button receives the touch input, the touch part transfers pressure to the first conductive part, so that the first conductive part moves relative to the second conductive part, thus changing a capacitance. A gesture of the touch input is determined based on a position of the capacitance change, and different control instructions are determined according to different gestures. In this way, various control operations can be realized by performing touch inputs with different gestures on one touch button, thereby reducing the quantity of touch buttons and preventing accidental touches.

It is to be understood that in an embodiment of the present disclosure, the radio frequency unit 601 may be configured to receive and send a signal during an information receiving and sending process or a call process. Specifically, after downlink data from a base station is received, the downlink data is sent to the processor 610 for processing. In addition, uplink data is sent to the base station. Generally, the radio frequency unit 601 includes, but is not limited to, an antenna, at least one amplifier, a transceiver, a coupler, a low noise amplifier, a duplexer, and the like. In addition, the radio frequency unit 601 may further communicate with a network and another device through a wireless communication system.

The electronic device provides wireless broadband Internet access for a user by using the network module 602, for example, helps the user to send and receive an email, browse a webpage, and access stream media, and the like.

The audio output unit 603 may convert audio data received by the radio frequency unit 601 or the network module 602 or stored in the memory 609 into an audio signal and output the audio signal as sound. In addition, the audio output unit 603 may further provide an audio output that is related to a particular function executed by the electronic device 600 (for example, a call signal receiving sound or a message receiving sound). The audio output unit 603 includes a loudspeaker, a buzzer, a receiver, and the like.

The input unit 604 is configured to receive an audio signal or a video signal. The input unit 604 may include a graphics processing unit (GPU) 6041 and a microphone 6042. The graphics processing unit 6041 performs processing on image data of a static picture or a video that is obtained by an image capture apparatus (for example, a camera) in a video capture mode or an image capture mode. An image frame that has been processed may be displayed on the display unit 606. An image frame that has been processed by the graphics processing unit 6041 may be stored in the memory 609 (or another storage medium) or sent by using the radio frequency unit 601 or the network module 602. The microphone 6042 may receive a sound, and can process the sound into audio data. The processed audio data may be converted, in a phone talk mode, into a format that may be sent to a mobile communication base station via the radio frequency unit 601 for output.

The electronic device 600 further includes at least one sensor 605, such as an optical sensor, a motion sensor, and another sensor, Specifically, the optical sensor includes an ambient light sensor and a proximity sensor. The ambient light sensor may adjust the luminance of the display panel 6061 according to the brightness of the ambient light. The proximity sensor may switch off the display panel 6061 and/or backlight when the electronic device 600 is moved to the ear. As a type of motion sensor, an acceleration sensor may detect the magnitude of accelerations in various directions (which generally are triaxial), may detect the magnitude and direction of the gravity when static, and may be configured to identify an electronic device attitude (such as switchover between horizontal and vertical screens, a related game, and attitude calibration of a magnetometer), a related function of vibration identification (such as a pedometer and a knock); and the sensor 605 may further include a fingerprint sensor, a pressure sensor, an iris sensor, a molecular sensor, a gyroscope, a barometer, a hygrometer, a thermometer, an infrared sensor, and the like, which are not be repeated herein.

The display unit 606 is configured to display information input by the user or information provided for the user. The display unit 606 may include a display panel 6061. The display panel 6061 may be configured by using a liquid crystal display (LCD), an organic light-emitting diode (OLED), or the like.

The user input unit 607 may be configured to receive input digit or character information, and generate a key signal input related to the user setting and function control of the electronic device. Specifically, the user input unit 607 includes a touch panel 6071 and another input device 6072. The touch panel 6071, also referred to as a touchscreen, may collect a touch operation of a user on or near the touch panel (such as an operation of a user on or near the touch panel 6071 by using any suitable object or attachment, such as a finger or a touch pen). The touch panel 6071 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and transfers the touch point coordinates to the processor 610. Moreover, the touch controller may receive and execute a command transferred from the processor 610. In addition, the touch panel 6071 may be implemented by using various types, such as a resistive type, a capacitive type, an infrared type, and a surface acoustic wave type, in addition to the touch panel 6071, the user input unit 607 may further include the another input device 6072. Specifically, the another input device 6072 may include, but is not limited to, a physical keyboard, a functional key (such as a volume control key or a switch key), a track ball, a mouse, and a joystick, which are not repeated herein.

Further, the touch panel 6071 may cover the display panel 6061. After detecting a touch operation on or near the touch panel 6071, the touch panel transfers the touch operation to the processor 610, to determine a type of a touch event. Then, the processor 610 provides a corresponding visual output on the display panel 6061 according to the type of the touch event. In FIG. 6, the touch panel 6071 and the display panel 6061 implement, as two independent parts, input and output functions of the electronic device. However, in some embodiments, the touch panel 6071 and the display panel 6061 may be integrated to implement the input and output functions of the electronic device, which is not specifically limited herein.

The interface unit 608 is an interface for connecting an external apparatus to the electronic device 600. For example, the external apparatus may include a wired or wireless headset port, an external power supply (or battery charger) port, a wired or wireless data port, a storage card port, a port configured to connect an apparatus having an identification module, an audio input/output (I/O) port, a video I/O port, an earphone port, and the like. The interface unit 608 may be configured to receive an input (for example, data information or electric power) from an external apparatus and transmit the received input to one or more components in the electronic device 600 or may be configured to transmit data between the electronic device 600 and the external apparatus.

The memory 609 may be configured to store a software program and various data. The memory 609 may mainly include a program storage region and a data storage region. The program storage area may store an operating system, an application required by at least one function (for example, a sound playback function and an image display function), and the like. The data storage area may store data (for example, audio data and an address book) created according to the use of the mobile phone, and the like. In addition, the memory 609 may include a high-speed random access memory, and may further include a non-volatile memory, such as at least one magnetic disk storage device, a flash memory, or another volatile solid-state storage device.

The processor 610 is a control center of the electronic device, and connects various parts of the entire electronic device by using various interfaces and lines. By running or executing the software program and/or module stored in the memory 609, and invoking data stored in the memory 609, the processor performs various functions of the electronic device and processes data, thereby performing overall monitoring on the electronic device. The processor 610 may include one or more processing units. The processor 610 may integrate an application processor and a modem processor. The application processor mainly processes an operating system, a user interface, an application, and the like. The modem processor mainly processes wireless communication. It may be understood that the foregoing modem processor may not be integrated into the processor 610.

The electronic device 600 further includes the power supply 611 (for example, a battery) for supplying power to the components. the power supply 611 may be logically connected to the processor 610 by using a power management system, thereby implementing functions such as charging, discharging, and power consumption management by using the power management system.

In addition, the electronic device 600 includes some functional modules not shown, which are not described herein again.

The embodiments of the present disclosure further provide a computer-readable storage medium storing therein a computer program. The computer program is executable by a processor to implement the processes of the embodiments of the foregoing control method, and the same technical effects can be achieved, which will not be described in detail herein again to avoid repetition. The computer-readable storage medium may include a flash drive, a read-only memory (ROM), a random access memory (RAM), a magnetic disk, or an optical disc.

It is to be noted that, the term "include", "comprise" or any other variation thereof in this specification is intended to cover a non-exclusive inclusion, which specifies the presence of stated processes, methods. Objects, or apparatuses, but does not preclude the presence or addition of one or more other processes, methods, objects, or apparatuses. Without more limitations, elements defined by the sentence "including one . . . " does not exclude that there are still other same elements in the processes, methods, objects, or apparatuses.

The foregoing descriptions are merely specific implementations of the present disclosure, and are not intended to limit the protection scope of the present disclosure. Any variation or replacement within the technical scope disclosed in the present disclosure shall fall within the protection scope of the present disclosure. Therefore, the protection scope of the present disclosure shall be subject to the protection scope of the claims.

What is claimed is:

1. A touch button having multiple control functions integrated thereon, comprising: a first conductive part; a second conductive part; and a touch part,
   wherein the second conductive part partially surrounds the first conductive part, a portion of the first conductive part is exposed from the second conductive part, a gap exists between an unexposed portion of the first conductive part and the second conductive part, and the first conductive part is movable relative to the second conductive part; and the touch part comprises a touch member and an elastic member wherein the touch member is configured to transfer pressure to the exposed portion of the first conductive part through the elastic member, wherein the elastic member wraps the exposed portion of the first conductive part and is positioned above the second conductive part,
wherein a touch input received by the touch part causes a capacitance change between the first conductive part and the second conductive part in one of a plurality of preset directions, and each preset direction corresponds to a different control instruction detectable by the touch button.

2. The touch button according to claim 1, wherein the first conductive part is in a spherical shape, and the first conductive part is capable of rolling relative to the second conductive part.

3. The touch button according to claim 1, wherein a non-conductive support member is disposed between the unexposed portion of the first conductive part and the second conductive part.

4. The touch button according to claim 1, wherein the elastic member comprises a non-conductive material.

5. The touch button according to claim 1, wherein a fingerprint recognition module is disposed in the touch part.

6. The touch button according to claim 1, wherein capacitance changes in two directions perpendicular to each other correspond to two different control instructions respectively.

7. The touch button according to claim 1, wherein capacitance changes in two directions opposite to each other correspond to two different control instructions respectively.

8. An electronic device, comprising the touch button according to claim 1, a memory storing a computer program, and a processor coupled to the memory and configured to execute the computer program to perform a control method, comprising:
receiving a touch input acting on a touch part of the touch button, wherein the touch part transfers pressure of the touch input to a first conductive part of the touch button, so that the first conductive part moves relative to a second conductive part of the touch button;
detecting whether there is any capacitance change between the first conductive part and the second conductive part in a plurality of preset directions, wherein each preset direction corresponds to a different control instruction detectable by the touch button; and
determining, when a capacitance change exists in a target direction among the plurality of preset directions, a control instruction corresponding to the target direction;
wherein:
the second conductive part partially surrounds the first conductive part;
a portion of the first conductive part is exposed from the second conductive part;
a gap exists between an unexposed portion of the first conductive part and the second conductive part;
the first conductive part is movable relative to the second conductive part; and
the touch part comprises a touch member and an elastic member, wherein the touch member is configured to transfer the pressure to the exposed portion of the first conductive part through the elastic member, wherein the elastic member wraps the exposed portion of the first conductive part and is positioned above the second conductive part.

9. A control method, performed by an electronic device having a touch button, wherein the touch button has multiple control functions integrated thereon, the control method comprising:
receiving a touch input acting on a touch part of the touch button, wherein the touch part transfers pressure of the touch input to a first conductive part of the touch button, so that the first conductive part moves relative to a second conductive part of the touch button;
detecting whether there is any capacitance change between the first conductive part and the second conductive part in a plurality of preset directions, wherein each preset direction corresponds to a different control instruction detectable by the touch button; and
determining, when a capacitance change exists in a target direction among the plurality of preset directions, a control instruction corresponding to the target direction, wherein:
the second conductive part partially surrounds the first conductive part;
a portion of the first conductive part is exposed from the second conductive part;
a gap exists between an unexposed portion of the first conductive part and the second conductive part;
the first conductive part is movable relative to the second conductive part; and
the touch part comprises a touch member and an elastic member. wherein the touch member is configured to transfer the pressure to the exposed portion of the first conductive part through the elastic member, wherein the elastic member wraps the exposed portion of the first conductive part and is positioned above the second conductive part.

10. The control method according to claim 9, wherein the plurality of preset directions comprise at least one of the following:
a first positive direction and a first negative direction along a first axis;
a second positive direction and a second negative direction along a second axis; or
a third positive direction and a third negative direction along a third axis,
the first axis, the second axis, and the third axis being perpendicular to each other.

11. The control method according to claim 9, wherein when the capacitance change exists in the target direction among the plurality of preset directions, the method further comprises:
acquiring a capacitance change parameter in the target direction; and
determining a corresponding control instruction according to the target direction and the capacitance change parameter,
wherein the capacitance change parameter comprises at least one of the following: a capacitance change value, a quantity of capacitance changes, or a capacitance change duration.

12. The control method according to claim 9, wherein after the receiving a touch input acting on a touch part of the touch button, the method further comprises:
acquiring fingerprint information according to the touch input; and
performing the operation of detecting whether there is any capacitance change in the plurality of preset directions when the fingerprint information matches preset fingerprint information.

13. The control method according to claim 9, wherein capacitance changes in two directions perpendicular to each other correspond to two different control instructions respectively.

14. The control method according to claim 9, wherein capacitance changes in two directions opposite to each other correspond to two different control instructions respectively.

15. A non-transitory computer-readable storage medium, storing a computer program, wherein the computer program, when executed by a processor, implements a control method performed by an electronic device having a touch button, the method comprising:
- receiving a touch input acting on a touch part of the touch button, wherein the touch part transfers pressure of the touch input to a first conductive part of the touch button, so that the first conductive part moves relative to a second conductive part of the touch button;
- detecting whether there is any capacitance change between the first conductive part and the second conductive part in a plurality of preset directions, wherein each preset direction corresponds to a different control instruction detectable by the touch button; and
- determining, when a capacitance change exists in a target direction among the plurality of preset directions, a control instruction corresponding to the target direction, wherein:
- the second conductive part partially surrounds the first conductive part;
- a portion of the first conductive part is exposed from the second conductive part;
- a gap exists between an unexposed portion of the first conductive part and the second conductive part;
- the first conductive part is movable relative to the second conductive part; and
- the touch part comprises a touch member and an elastic member, wherein the touch member is configured to transfer the pressure to the exposed portion of the first conductive part through the elastic member, wherein the elastic member wraps the exposed portion of the first conductive part and is positioned above the second conductive part.

16. The non-transitory computer-readable storage medium according to claim 15, wherein capacitance changes in two directions perpendicular to each other correspond to two different control instructions respectively.

17. The non-transitory computer-readable storage medium according to claim 15, wherein capacitance changes in two directions opposite to each other correspond to two different control instructions respectively.

* * * * *